US008429377B2

(12) United States Patent
Chen et al.

(10) Patent No.: US 8,429,377 B2
(45) Date of Patent: Apr. 23, 2013

(54) OPTIMIZING TLB ENTRIES FOR MIXED PAGE SIZE STORAGE IN CONTIGUOUS MEMORY

(75) Inventors: Dong Chen, Yorktown Heights, NY (US); Alan Gara, Yorktown Heights, NY (US); Mark E. Giampapa, Yorktown Heights, NY (US); Philip Heidelberger, Yorktown Heights, NY (US); Jon K. Kriegel, Rochester, MN (US); Martin Ohmacht, Yorktown Heights, NY (US); Burkhard Steinmacher-Burow, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/684,642

(22) Filed: Jan. 8, 2010

(65) Prior Publication Data

US 2011/0173411 A1 Jul. 14, 2011

(51) Int. Cl.
*G06F 12/06* (2006.01)
(52) U.S. Cl.
USPC .................. 711/207; 711/206; 711/E12.061; 711/E12.059
(58) Field of Classification Search .................. 711/207, 711/206, 203, E12.059, E12.061, E12.001
See application file for complete search history.

(56) References Cited

U.S. PATENT DOCUMENTS

| | | | | |
|---|---|---|---|---|
| 5,724,538 A * | 3/1998 | Morris et al. | .................. | 711/206 |
| 5,907,866 A | 5/1999 | Martens et al. | | |
| 6,233,668 B1 * | 5/2001 | Harvey et al. | .................. | 711/206 |
| 6,345,351 B1 * | 2/2002 | Holmberg | ...................... | 711/203 |
| 6,865,590 B2 * | 3/2005 | Park | .............................. | 708/671 |
| 6,901,540 B1 | 5/2005 | Griffith, Jr. et al. | | |
| 7,181,587 B1 | 2/2007 | Hastings | | |
| 7,305,487 B2 | 12/2007 | Blumrich et al. | | |
| 2003/0200405 A1 * | 10/2003 | Willman et al. | .............. | 711/163 |
| 2008/0320228 A1 | 12/2008 | Brunheroto et al. | | |
| 2009/0019252 A1 | 1/2009 | Burns et al. | | |
| 2010/0115229 A1 * | 5/2010 | Thelen | .......................... | 711/206 |
| 2011/0219208 A1 * | 9/2011 | Asaad et al. | .................... | 712/12 |

OTHER PUBLICATIONS

RD 481001 A, May 2004, Durrant, P.*
Kumar, S. et al., "Optimization of All-to-All Communication on the Blue Gene/L Supercomputer" Parallel Processing, 2008, ICPP apos;08. 37th International Conference, 2008, pp. 320-329.
Adiga, N. R., et al., "Blue Gene/L torus interconnection network" IBM Journal of Research and Development, 2005, pp. 265-276, vol. 49, Issue 2.
IBM's Device Control Register Bus 3.5 Architecture Specifications Jan. 27, 2006.

* cited by examiner

*Primary Examiner* — Pierre-Michel Bataille
(74) *Attorney, Agent, or Firm* — Scully, Scott, Murphy & Presser, P.C.; Daniel P. Morris, Esq.

(57) ABSTRACT

A system and method for accessing memory are provided. The system comprises a lookup buffer for storing one or more page table entries, wherein each of the one or more page table entries comprises at least a virtual page number and a physical page number; a logic circuit for receiving a virtual address from said processor, said logic circuit for matching the virtual address to the virtual page number in one of the page table entries to select the physical page number in the same page table entry, said page table entry having one or more bits set to exclude a memory range from a page.

20 Claims, 7 Drawing Sheets

| Page Size | log2 (page size) | Bits used in TLB Matching | EPN bits | Exclusion range bits (LSB) |
|---|---|---|---|---|
| (*) 4KB = 2^12 byte | 12 | 52=64-12 | 0:51 | No unused bits |
| (*) 64KB = 2^16 byte | 16 | 48=64-16 | 0:47 | 48:51 |
| (*) 1MB = 1024 KB = 2^20 byte | 20 | 44=64-20 | 0:43 | 44:51 |
| (*) 16MB = 2^24 byte | 24 | 40=64-24 | 0:39 | 40:51 |
| (*) 1GB = 2^30 byte | 30 | 34=64-30 | 0:33 | 34:51 |

* = page sizes supported by the A2 processor core

FIG. 4

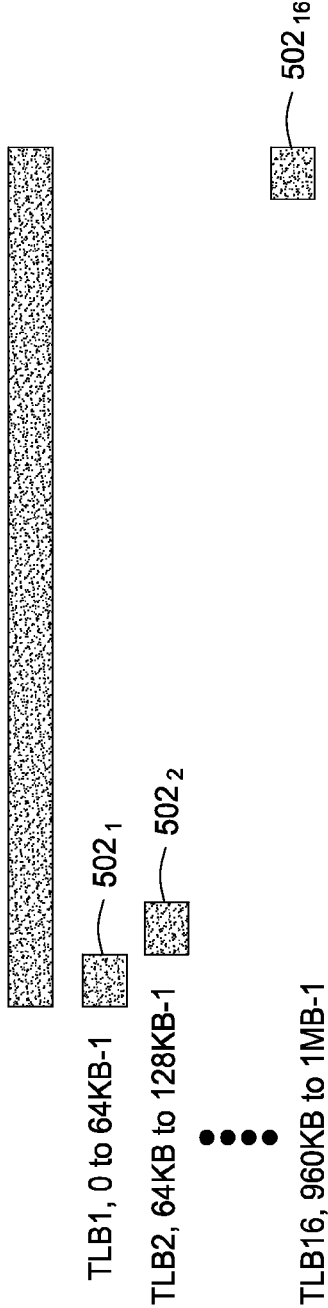
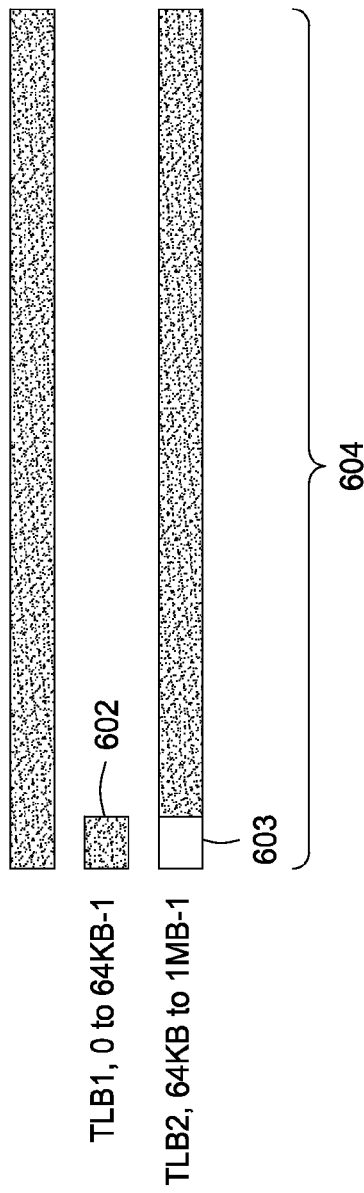
FIG. 5
(PRIOR ART)
FIG. 6

US 8,429,377 B2

OPTIMIZING TLB ENTRIES FOR MIXED PAGE SIZE STORAGE IN CONTIGUOUS MEMORY

STATEMENT OF GOVERNMENT RIGHTS

This invention was made with Government support under Contract No. B554331 awarded by the Department of Energy. The Government has certain rights in the invention.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 12/684,367, for "USING DMA FOR COPYING PERFORMANCE COUNTER DATA TO MEMORY"; U.S. patent application Ser. No. 12/684,172 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. patent application Ser. No. 12/684,496, for "HARDWARE SUPPORT FOR SOFTWARE CONTROLLED FAST RECONFIGURATION OF PERFORMANCE COUNTERS"; U.S. patent application Ser. No. 12/684,429, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, for "DISTRIBUTED PERFORMANCE COUNTERS"; U.S. patent application Ser. No. 12/696,780, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,184, for "ZONE ROUTING IN A TORUS NETWORK"; U.S. patent application Ser. No. 12/684,852, for "PROCESSOR WAKEUP UNIT"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME MESSAGE"; U.S. patent application Ser. No. 12/688,773, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/696,825, for "LIST BASED PREFETCH"; U.S. patent application Serial No. 12/684,693, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 12/731,796, for "NETWORK SUPPORT FOR SYSTEM INITIATED CHECKPOINTS"; U.S. patent application Ser. No. 12/696,746, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 12/727,967, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Serial No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287 for ARBITRATION IN CROSSBAR FOR LOW LATENCY; U.S. patent application Ser. No. 12/684,630 for EAGER PROTOCOL ON A CACHE PIPELINE DATAFLOW; U.S. patent application Ser. No. 12/723,277 for EMBEDDED GLOBAL BARRIER AND COLLECTIVE IN A TORUS NETWORK; U.S. patent application Ser. No. 12/696,764 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Ser. No. 12/696,817 for HEAP/STACK GUARD PAGES USING A WAKEUP UNIT; U.S. patent application Ser. No. 12/697,164 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475 for REPRODUCIBILITY IN BGQ.

BACKGROUND

The present invention relates generally to computer devices and memory management systems thereof that employ a translation look-aside buffer (TLB), and particularly to a system and method for optimizing page entries in a TLB.

Organizing memory into pages is useful in that it allows the computer system to address memory by virtual addresses, with components such as the TLB able to map the virtual addresses to physical addresses stored in memory. This allows the computer system to address more memory than is physically available.

One limiting property of page entries in a TLB is that, for a given page size, the page start address must be aligned to the page size. This is problematic when using a mix of small and large page sizes because it requires that either the large pages are adjacent to one another, or that the "gaps" between large pages are filled in with numerous smaller pages. This, in turn, requires using more TLB page entries to define a large, contiguous range of memory that is subject to translation. For example, if only 64 KB page entries are available, then 16 individual 64 KB page entries are required to form a contiguous 1 MB page entry.

Thus, there is a need in the art for a system and method for optimizing page entries in a TLB. The system and method allows a mix of page sizes to exist together in one contiguous area of memory while reducing the number of page entries in the TLB.

BRIEF DESCRIPTION OF FIGURES

FIG. 4 is a table of page sizes and their corresponding EPN and exclusion range bits available in the BlueGene parallel computing system;

FIG. 5 is an example of prior art TLB page entries;

FIG. 6 is an example of optimized TLB page entries;

SUMMARY

In one embodiment, a system for accessing memory. The system comprises a lookup buffer for storing one or more page table entries, wherein each of the one or more page table entries comprises at least a virtual page number and a physical page number; a logic circuit for receiving a virtual address from said processor, said logic circuit for matching the virtual address to the virtual page number in one of the page table entries to select the physical page number in the same page table entry, said page table entry having one or more bits set to exclude a memory range from a page.

In another embodiment, a method for accessing memory comprising receiving at a logic device a virtual address; and matching the virtual address to a virtual page number in one of one or more page table entries stored in a lookup table to select a physical page and translate the virtual address to a physical address, said page table entry having one or more bits set to exclude a memory range in a page.

DESCRIPTION

Figure 1:
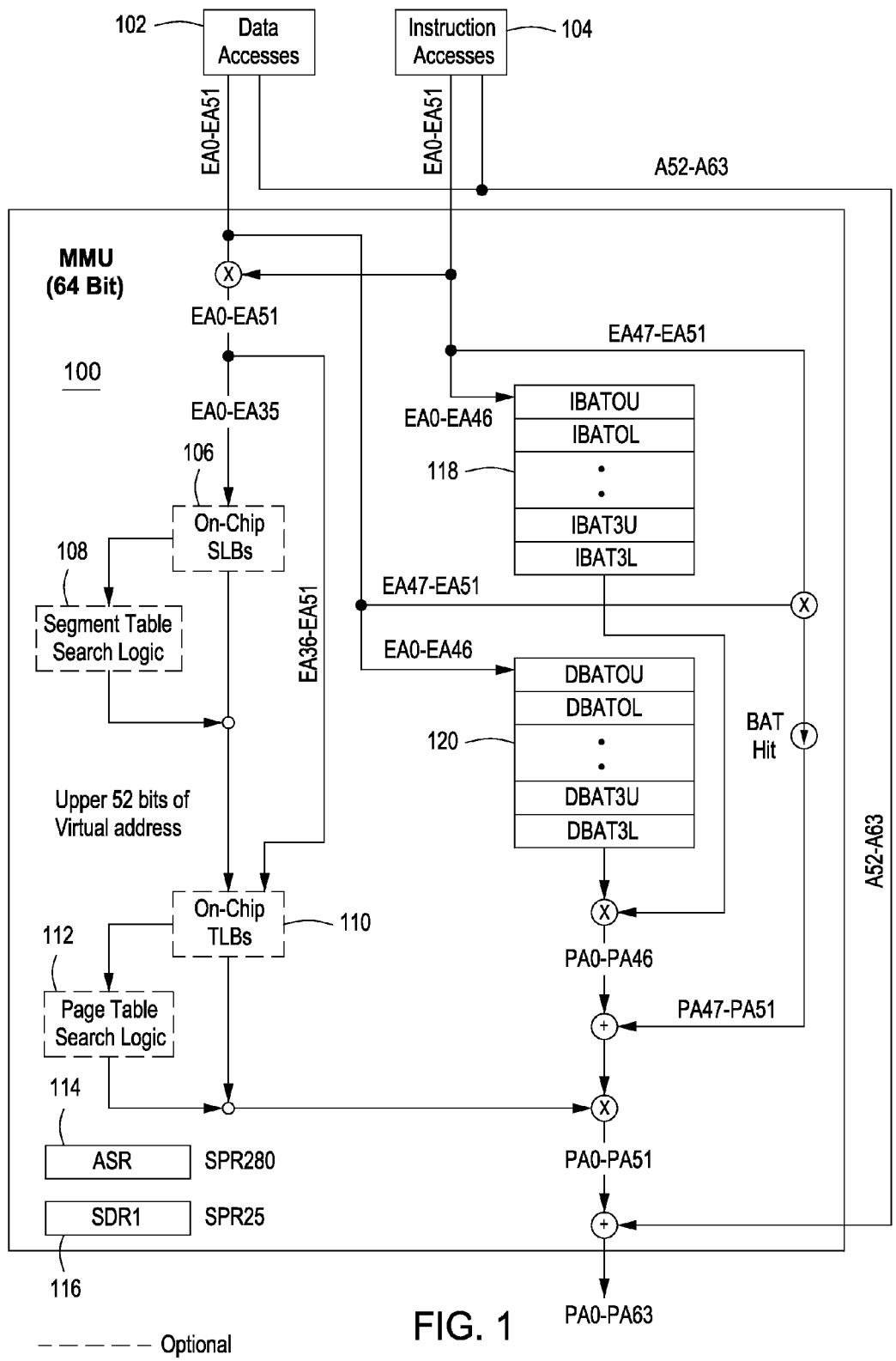
FIG. 1 is an overview of a memory management unit (MMU) utilized by the BlueGene parallel computing system.

FIG. 1 is an overview of a memory management unit 100 (MMU) utilized by in a multiprocessor system, such as IBM's BlueGene parallel computing system. Further details about the MMU 100 are provided in IBM's "PowerPC RISC Microprocessor Family Programming Environments Manual v2.0" (hereinafter "PEM v2.0") published Jun. 10, 2003 which is incorporated by reference in its entirety. The MMU 100 receives data access requests from the processor (not shown) through data accesses 102 and receives instruction access requests from the processor (not shown) through instruction accesses 104. The MMU 100 maps effective memory addresses to physical memory addresses to facilitate retrieval of the data from the physical memory. The physical memory may include cache memory, such as L1 cache, L2 cache, or L3 cache if available, as well as external main memory, e.g., DDR3 SDRAM.

The MMU 100 comprises an SLB 106, an SLB search logic device 108, a TLB 110, a TLB search logic device 112, an Address Space Register (ASR) 114, an SDR1 116, a block address translation (BAT) array 118, and a data block address translation (DBAT) array 120. The SDR1 116 specifies the page table base address for virtual-to-physical address translation. Block address translation and data block address translation are one possible implementation for translating an effective address to a physical address and are discussed in further detail in PEM v2.0 and U.S. Pat. No. 5,907,866.

Another implementation for translating an effective address into a physical address is through the use of an on-chip SLB, such as SLB 106, and an on-chip TLB, such as TLB 110. Prior art SLBs and TLBs are discussed in U.S. Pat. No. 6,901,540 and U.S. Publication No. 20090019252, both of which are incorporated by reference in their entirety. In one embodiment, the SLB 106 is coupled to the SLB search logic device 108 and the TLB 110 is coupled to the TLB search logic device 112. In one embodiment, the SLB 106 and the SLB search logic device 108 function to translate an effective address (EA) into a virtual address. The function of the SLB is further discussed in U.S. Publication No. 20090019252. In the PowerPC™ reference architecture, a 64 bit effective address is translated into an 80 bit virtual address. In the A2 implementation, a 64 bit effective address is translated into an 88 bit virtual address.

In one embodiment of the A2 architecture, both the instruction cache and the data cache maintain separate "shadow" TLBs called ERATs (effective to real address translation tables). The ERATs contain only direct (IND=0) type entries. The instruction I-ERAT contains 16 entries, while the data D-ERAT contains 32 entries. These ERAT arrays minimize TLB 110 contention between instruction fetch and data load/store operations. The instruction fetch and data access mechanisms only access the main unified TLB 110 when a miss occurs in the respective ERAT. Hardware manages the replacement and invalidation of both the I-ERAT and D-ERAT; no system software action is required in MMU mode. In ERAT-only mode, an attempt to access an address for which no ERAT entry exists causes an Instruction (for fetches) or Data (for load/store accesses) TLB Miss exception.

The purpose of the ERAT arrays is to reduce the latency of the address translation operation, and to avoid contention for the TLB 110 between instruction fetches and data accesses. The instruction ERAT (I-ERAT) contains sixteen entries, while the data ERAT (D-BRAT) contains thirty-two entries, and all entries are shared between the four A2 processing threads. There is no latency associated with accessing the ERAT arrays, and instruction execution continues in a pipelined fashion as long as the requested address is found in the ERAT. If the requested address is not found in the BRAT, the instruction fetch or data storage access is automatically stalled while the address is looked up in the TLB 110. If the address is found in the TLB 110, the penalty associated with the miss in the I-ERAT shadow array is 12 cycles, and the penalty associated with a miss in the D-ERAT shadow array is 19 cycles. If the address is also a miss in the TLB 110, then an Instruction or Data TLB Miss exception is reported.

When operating in MMU mode, the on-demand replacement of entries in the ERATs is managed by hardware in a least-recently-used (LRU) fashion. Upon an ERAT miss which leads to a TLB 110 hit, the hardware will automatically cast-out the oldest entry in the BRAT and replace it with the new translation. The TLB 110 and the ERAT can both be used to translate an effective or virtual address to a physical address. The TLB 110 and the ERAT may be generalized as "lookup tables".

Figure 3:
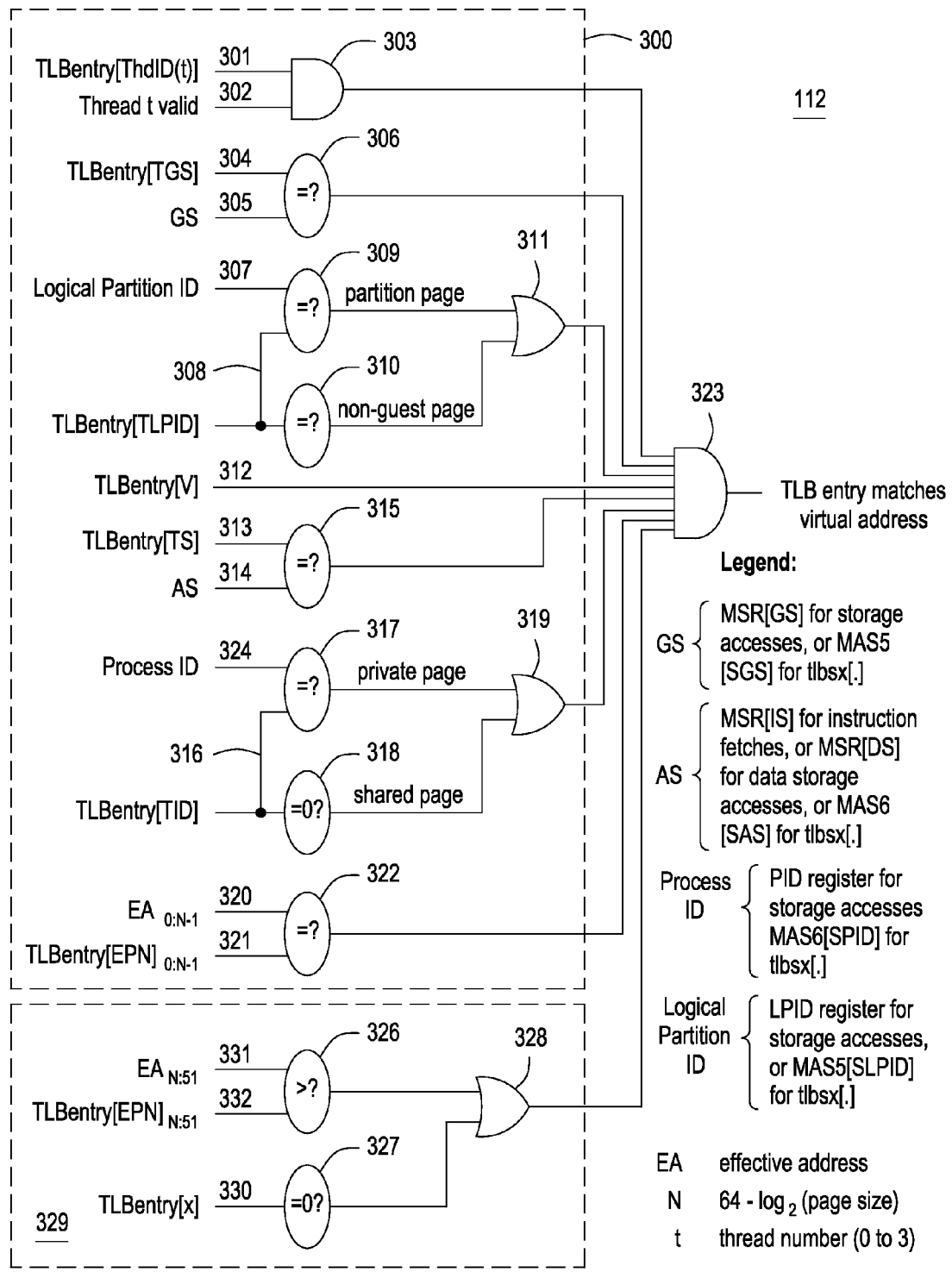
FIG. 3 is a page table search logic device.

The TLB 110 and TLB search logic device 112 function together to translate virtual addresses supplied from the SLB 106 into physical addresses. A prior art TLB search logic device 112 is shown in FIG. 3. A TLB search logic device 112 according to one embodiment of the invention is shown in FIG. 4. The TLB search logic device 112 facilitates the optimization of page entries in the TLB 110 as discussed in further detail below.

Figure 2:
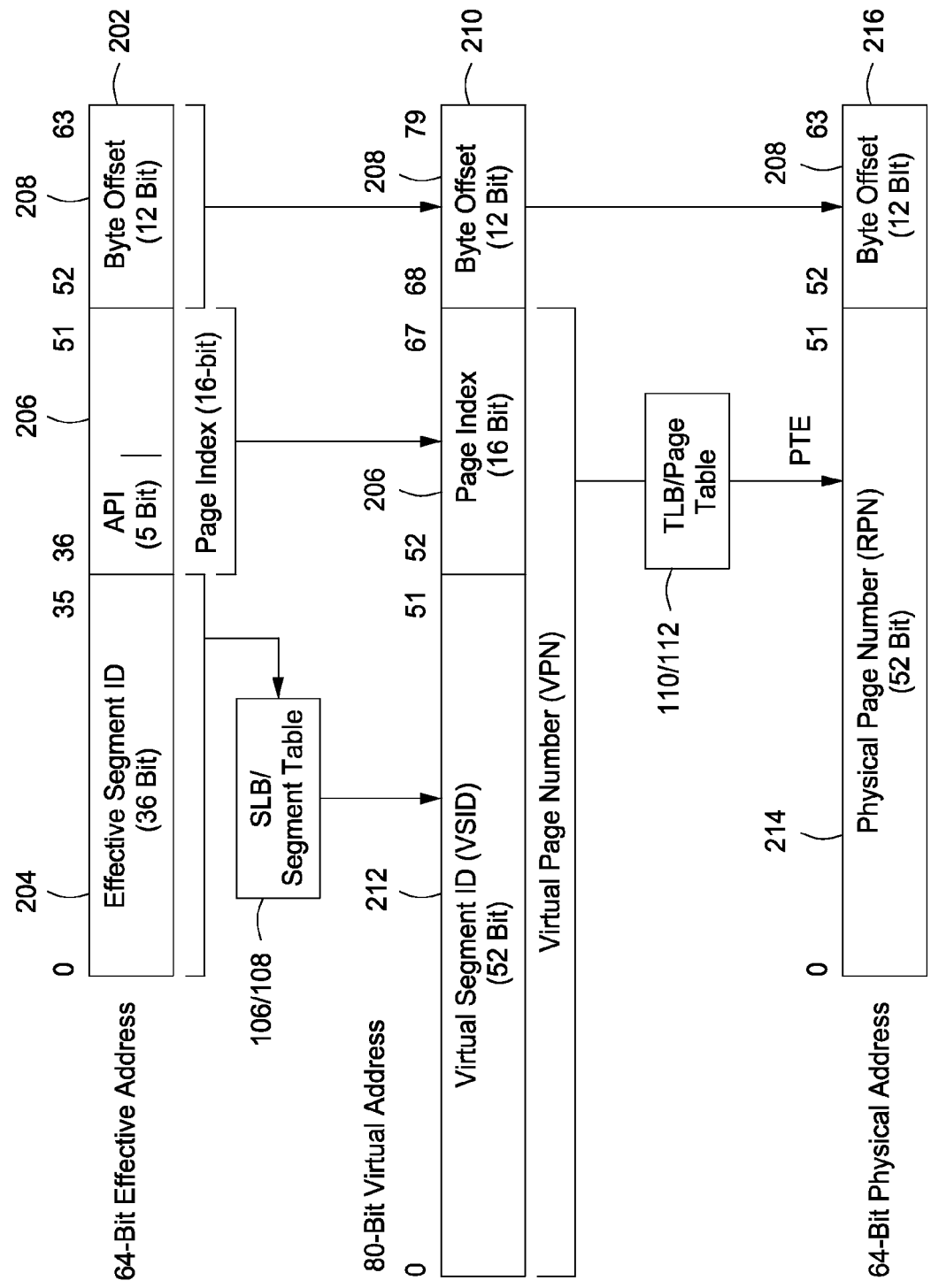
FIG. 2 is a flow diagram of address translation in the IBM BlueGene parallel computing system.

Referring to FIG. 2, the TLB search logic device 112 controls page identification and address translation, and contains page protection and storage attributes. The Valid (V), Effective Page Number (EPN), Translation Guest Space identifier (TGS), Translation Logical Partition identifier (TLPID), Translation Space identifier (TS), Translation ID (TID), and Page Size (SIZE) fields of a particular TLB entry identify the page associated with that TLB entry. In addition, the indirect (IND) bit of a TLB entry identifies it as a direct virtual to real translation entry (IND=0), or an indirect (IND=1) hardware page table pointer entry that requires additional processing. All comparisons using these fields should match to validate an entry for subsequent translation and access control processing. Failure to locate a matching TLB page entry based on the criteria for instruction fetches causes a TLB miss exception which results in issuance of an Instruction TLB error interrupt. Failure to locate a matching TLB page entry based on this criteria for data storage accesses causes a TLB miss exception which may result in issuance of a data TLB error interrupt, depending on the type of data storage access. Certain cache management instructions do not result in an interrupt if they cause an exception; these instructions may result in a no-op.

Page identification begins with the expansion of the effective address into a virtual address. The effective address is a 64-bit address calculated by a load, store, or cache management instruction, or as part of an instruction fetch. In one embodiment of a system employing the A2 processor, the virtual address is formed by prepending the effective address with a 1-bit 'guest space identifier', an 8-bit 'logical partition identifier', a 1-bit 'address space identifier' and a 14-bit 'process identifier'. The resulting 88-bit value forms the virtual address, which is then compared to the virtual addresses contained in the TLB page table entries. For instruction fetches, cache management operations, and for non-external PID storage accesses, these parameters are obtained as follows. The guest space identifier is provided by Machine State Register MACHINE STATE REGISTER [GS]. The logical partition identifier is provided by the Logical Partition ID (LPID) register. The process identifier is included in the Process ID (PID) register. The address space identifier is provided by MACHINE STATE REGISTER[IS] for instruction fetches, and by MACHINE STATE REGISTER[DS] for data storage accesses and cache management operations, including instruction cache management operations.

For external PID type load and store accesses, these parameters are obtained from the External PID Load Context (FPLC) or External PID Store Context (EPSC) registers. The guest space identifier is provided by EPL/SC[EGS] field. The logical partition identifier is provided by the EPUSC[ELPID] field. The process identifier is provided by the EPL/SC[EPID] field, and the address space identifier is provided by EPL/SC [EAS].

The address space identifier bit differentiates between two distinct virtual address spaces, one generally associated with interrupt-handling and other system-level code and/or data, and the other generally associated with application-level code and/or data. Typically, user mode programs will run with MACHINE STATE REGISTER[IS,DS] both set to 1, allowing access to application-level code and data memory pages. Then, on an interrupt, MACHINE STATE REGISTER[IS, DS] are both automatically cleared to 0, so that the interrupt handler code and data areas may be accessed using system-level TLB entries (i.e., TLB entries with the TS field=0).

FIG. 2 is an overview of the translation of a 64 bit EA 202 into an 80 bit VA 210 as implemented in a system employing the PowerPC architecture. In one embodiment, the 64 bit EA 202 comprises three individual segments: an 'effective segment ID' 204, a 'page index' 206, and a 'byte offset' 208. The 'effective segment ID' 204 is passed to the SLB search logic device 108 which looks up a match in the SLB 106 to produce a 52 bit virtual segment ID (VSID) 212. The 'page index' 206 and byte offset 208 remain unchanged from the 64 bit EA 202, and are passed through and appended to the 52 bit VSID 212. In one embodiment, the 'page index' 206 is 16 bits and the byte offset 208 is 12 bits, The 'byte offset' 208 is 12 bits and allows every byte within a page to be addressed. A 4 KB page requires a 12 bit page offset to address every byte within the page, i.e., $2^{12}$=4 KB. The VSID 212 and the 'page index' 206 are combined into a Virtual Page Number (VPN), which is used to select a particular page from a table entry within a TLB (TLB entries may be associated with more than one page). Thus, the VSID 212 and the 'page index' 206 is and the byte offset 208 are combined to form an 80 bit VA 210. A virtual page number (VPN) is formed from the VSID 212 and 'page index' 206. In one embodiment of the PowerPC architecture, the VPN comprises 68 bits. The VPN is passed to the TLB search logic device 112 which uses the VPN to look up a matching physical page number (RPN) 214 in the TLB 110, The RPN 214 together with the 12 bit byte offset form a 64 bit physical address 216.

FIG. 3 is a TLB logic device 112 for matching a virtual address to a physical address. A match between a virtual address and the physical address is found by the TLB logic device 112 when all of the inputs into 'AND' gate 318 are true, i.e., all of the input bits are set to 1. Each virtual address that is supplied to the TLB 110 is checked against every entry in the TLB 110.

The TLB logic device 112 comprises logic blocks 302 and logic block 329. Logic block 300 comprises 'AND' gates 303 and 323, comparators 306, 309, 310, 315, 317, 318 and 322, and 'OR' gates 311 and 319 . 'AND' gate 303 that receives input from TLBentry[ThdID(t)] (thread identifier) 301 and 'thread t valid' 302. TLBentry[ThdID(t)] 301 identifies a hardware thread and in one implementation there are 4 thread ID bits per TLB entry. 'Thread t valid' 304 indicates which thread is requesting a TLB lookup. The output of AND' gate 303 is 1 when the input of 'thread t valid' 302 is 1 and the value of 'thread identifier' is 1. 301 The output of AND' gate 303 is coupled to 'AND' gate 323.

Comparator 306 compares the values of inputs TLBentry [TGS] 304 and 'GS' 305. TLBentry[TGS] 304 is a TLB guest state identifier and 'GS' 305 is the current guest state of the processor. The output of comparator 306 is only true, i.e., a bit value of 1, when both inputs are of equal value. The output of comparator 306 is coupled to 'AND' gate 323.

Comparator 309 determines if the value of the 'logical partition identifier' 307 in the virtual address is equal to the value of the TLPID field 308 of the TLB page entry. Comparator 310 determines if the value of the TLPID field 308 is equal to 0 (non-guest page). The outputs of comparators 309 and 310 are supplied to an 'OR' gate 311. The output of 'OR' gate 311 is supplied to 'AND' gate 323. The 'AND' gate 323 also directly receives an input from 'validity bit' TLBentry [V] 312. The output of 'AND' gate 323 is only valid when the 'validity bit' 312 is set to 1.

Comparator 315 determines if the value of the 'address space' identifier 314 is equal to the value of the 'TS' field 313 of the TLB page entry. If the values match, then the output is 1. The output of the comparator 315 is coupled to 'AND' gate 323.

Comparator 317 determines if the value of the 'Process ID' 324 is equal to the 'TID' field 316 of the TLB page entry indicating a private page, or comparator 318 determines if the value of the TID field is 0, indicating a globally shared page. The output of comparators 317 and 318 are coupled to 'OR' gate 319. The output of 'OR' gate 319 is coupled to 'AND' gate 323.

Comparator 322 determines if the value in the 'effective page number' field 320 is equal to the value stored in the 'EPN' field 321 of the TLB page entry. The number of bits N in the 'effective page number' 320 is calculated by subtracting $log_2$ of the page size from the bit length of the address field. For example, if an address field is 64 bits long, and the page size is 4 KB, then the effective address field length is found according to equation 1:

$$EA=0 \text{ to } N-1, \text{ where } N=\text{Address Field Length}-log_2 \text{ (page size)} \quad (1)$$

or by subtracting $log_2(2^{12})$ or 12 from 64. Thus, only the first 52 bits, or bits 0 to 51 of the effective address are used in matching the 'effective address' 320 field to the 'EPN field' 321. The output of comparator 322 is coupled to 'AND' gate 323.

Logic block 329 comprises comparators 326 and 327 and 'OR' gate 328. Comparator 326 determines if the value of bits 'n:51' 331 of the effective address (where n=64−$log_2$(page size)) is greater than the value of bits n:51 of the 'EPN' field 332 in the TLB entry. Normally, the LSB are not utilized in translating the EA to a physical address. When the value of bits n:51 of the effective address is greater than the value stored in the EPN field, the output of comparator 326 is 1. Comparator 327 determines if the TLB entry 'exclusion bit' 330 is set to 1. If the 'exclusion bit' 330 is set to 1, than the output of comparator 327 is 1. The 'exclusion bit' 330 functions as a signal to exclude a portion of the effective address range from the current TLB page. Applications or the operating system may then map subpages (pages smaller in size than the current page size) over the excluded region. In one example embodiment of an IBM BlueGene parallel computing system, the smallest page size is 4 KB and the largest page size is 1 GB. Other available page sizes within the IBM BlueGene parallel computing system include 64 KB, 16 MB, and 256 MB pages. As an example, a 64 KB page may have a 16 KB range excluded from the base of the page. In other implementations, the comparator may be used to excluded a memory range from the top of the page. In one embodiment, an application may map additional pages smaller in page size than the original page, i.e., smaller than 16 KB into the area defined by the excluded range. In the example above, up to four additional 4 KB pages may be mapped into the excluded 16 KB range. Note that in some embodiments, the entire area covered by the excluded range is not always available for overlapping additional pages. It is also understood that the combination of logic gates within the TLB search logic device 112 may be replaced by any combination of gates that result in logically equivalent outcomes.

A page entry in the TLB 110 is only matched to an EA when all of the inputs into the 'AND' gate 323 are true, i.e., all the input bits are 1. Referring back to FIG. 2, the page table entry (PTE) 212 matched to the EA by the TLB search logic device 112 provides the physical address 216 in memory where the data requested by the effective address is stored.

FIGS. 3 and 4 together illustrate how the TLB search logic device 112 is used to optimize page entries in the TLB 110. One of the limiting properties of prior art TLB search logic devices is that, for a given page size, the page start address must be aligned to the page size. This requires that larger pages are placed adjacent to another in a contiguous memory range or that the gaps between large pages are filled in with numerous smaller pages. This requires the use of more TLB page entries to define a large contiguous range of memory.

FIG. 4 is a table that provides which bits within a virtual address are used by the TLB search logic device 112 to match the virtual address to a physical address and which 'exclusion range' bits are used to map a 'hole' or an exclusion range into an existing page. FIGS. 3 and 4 are based on the assumption that the processor core utilized is a PowerPC™ A2 core, the EA is 64 bits in length, and the smallest page size is 4 KB. Other processor cores may implement effective addresses of a different length and benefit from additional page sizes.

Referring now to FIG. 4, column 402 of the table lists the available page sizes in the A2 core used in one implementation of the BlueGene parallel computing system. Column 404 lists all the calculated values of $log_2$ (page size). Column 406 lists the number of bits, i.e. MSB, required by the TLB search logic device 112 to match the virtual address to a physical address. Each entry in column 406 is found by subtracting $log_2$ (page size) from 64.

Column 408 lists the 'effective page number' (EPN) bits associated with each page size. The values in column 408 are based on the values calculated in column 406. For example, the TLB search logic device 112 requires all 52 bits (bits 0:51) of the EPN to look up the physical address of a 4 KB page in the TLB 110. In contrast, the TLB search logic device 112 requires only 34 bits (bits 0:33) of the EPN to look up the physical address of a 1 GB page in the TLB 110. Recall that in one example embodiment, the EPN is formed by a total of 52 bits. Normally, all of the LSB (the bits after the EPN bits) are set to 0. Exclusion ranges may be carved out of large size pages in units of 4 KB, i.e., when TLBentry[X] bit 330 is 1, the total memory excluded from the effective page is 4 KB* ((value of Exclusion range bits 440)+1). When the exclusion bit is set to 1 (X=1), even if the LSBs in the virtual page number are set to 0, a 4 KB page is still excluded from a large size page.

A 64 KB page only requires bits 0:47 within the EPN field to be set for the TLB search logic device 112 to find a matching value in the TLB 110. An exclusion range within the 64 KB page can be provided by setting LSBs 48:51 to any value except all '1's. Note that the only page size smaller than 64 KB is 4 KB. One or more 4 KB pages can be mapped by software into the excluded memory region covered by the 64 KB page when the TLBentry[X] (exclusion) bit is set to 1. When the TLB search logic device 112 maps a virtual address to a physical address and the TLB exclusion bit is also set to 1, the TLB search logic device 112 will return a physical address that maps to the 64 KB page outside the exclusion range. If the TLB exclusion bit is set to 0, the TLB search logic device 112 will return a physical address that maps to the whole area of the 64 KB page.

An application or the operating system may access the non excluded region within a page when the 'exclusion bit' 330 is set to 1. When this occurs, the TLB search logic device 112 uses the MSB to map the virtual address to a physical address that corresponds to an area within the non excluded region of the page. When the 'exclusion bit' 330 is set to 0, then the TLB search logic device 112 uses the MSB to map the virtual address to a physical address that corresponds to a whole page.

In one embodiment of the invention, the size of the exclusion range is configurable to M×4 KB, where M=1 to (TLB entry page size in bytes/$2^{12}$)−1. The smallest possible exclusion range is 4 KB, and successively larger exclusion ranges are multiples of 4 KB. In another embodiment of the invention, such as in the A2 core, for simplicity, M is further restricted to $2^n$, where n=0 to $\log_2$(TLB entry page size)−13, i.e., the possible excluded ranges are 4 KB, 8 KB, 16 KB, up to (page size)/2. Additional TLB entries may be mapped into the exclusion range. Pages mapped into the exclusion range cannot overlap and pages mapped in the exclusion range must be collectively fully contained within the exclusion range. The pages mapped into the exclusion range are known as subpages.

Once a TLB page table entry has been deleted from the TLB 110 by the operating system, the corresponding memory indicated by the TLB page table entry becomes available to store new or additional pages and subpages. TLB page table entries are generally deleted when their corresponding applications or processes are terminated by the operating system.

FIG. 5 is an example of how page table entries are created in a TLB 110 in accordance with the prior art. For simplification purposes only, the example assumes that only two page sizes, 64 KB and 1 MB are allowable. Under the prior art, once a 64 KB page is created in a 1 MB page, only additional 64 KB page entries may be used to map the remaining virtual address in the 1 MB page until a contiguous 1 MB area of memory is filled. This requires a total of 16 page table entries, i.e., 502$_1$, 502$_2$ to 502$_{16}$ in the TLB 110.

FIG. 6 is an example of how page table entries are created in a TLB 110 in accordance with the present invention. Different size pages may be used next to one another. For example, PTE 602 is a 64 KB page table entry and PTE 604 is a 1 MB page table entry. In one embodiment, PTE 604 has a 64 KB 'exclusion range' 603 excluded from the base corresponding to the area occupied by PTE 602. The use of an exclusion range allows the 1 MB memory space to be covered by only 2 page table entries in the TLB 110, whereas in FIG. 5 sixteen page table entries were required to cover the same range of memory. In one embodiment, when the 'exclusion bit' is set, the first 64 KB of the 1 MB page specified by PTE 604 will not match the virtual address, i.e., this area is excluded. In other embodiments of the invention, the excluded range may begin at the top of the page.

Figure 7:
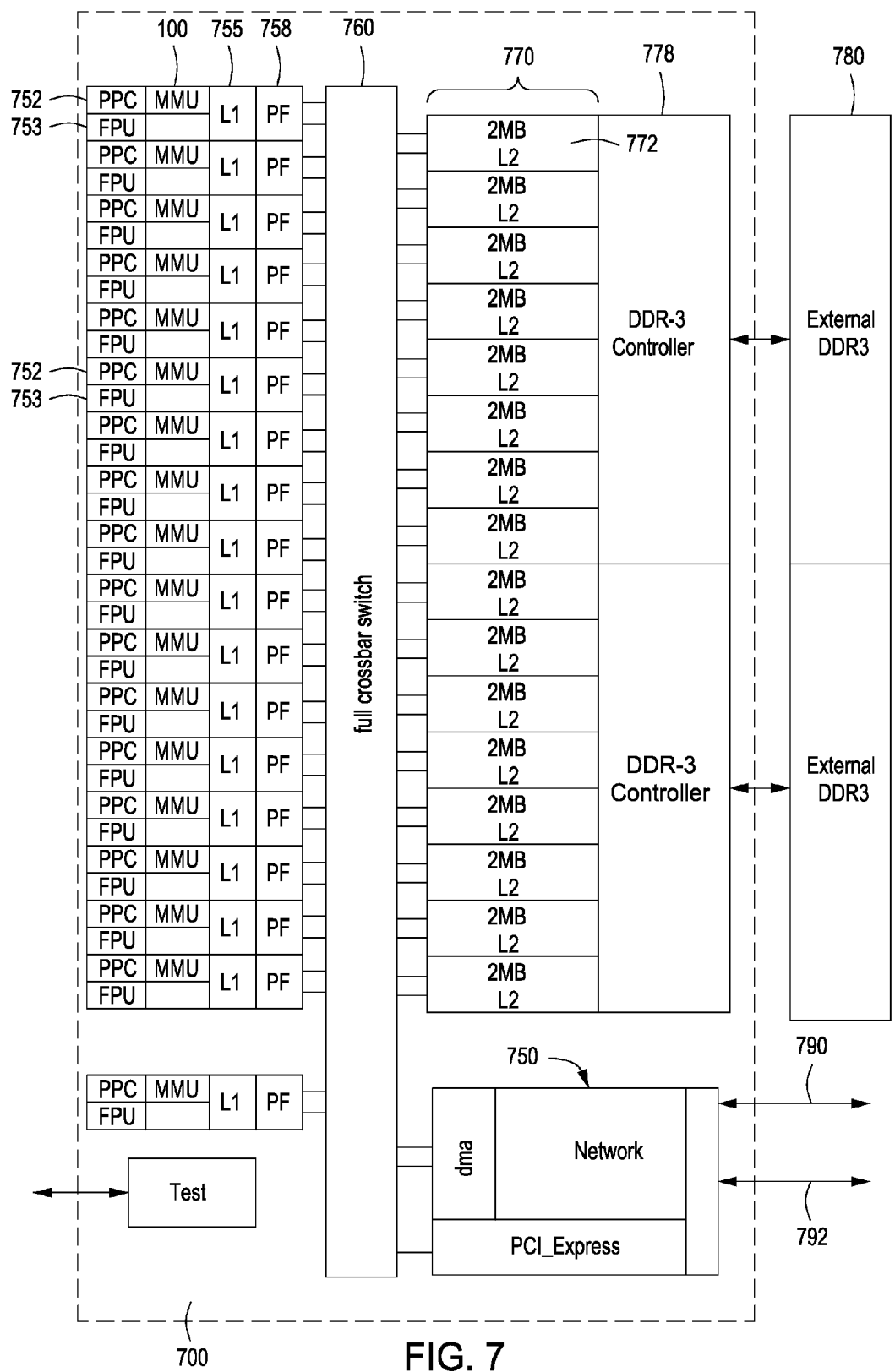
FIG. 7 is an overall architecture of a parallel computing environment that can benefit from the present invention.

Referring now to FIG. 7, there is shown the overall architecture of a multiprocessor compute node 700 implemented in a parallel computing system in which the present invention may be implemented. In one embodiment, the multiprocessor system implements a BLUEGENE™ torus interconnection network, which is further described in the journal article 'Blue Gene/L torus interconnection network' N. R. Adiga, et al., IBM J. Res. & Dev. Vol. 49, 2005, the contents of which are incorporated by reference in its entirety. Although the BLUEGENE™/L torus architecture comprises a three-dimensional torus, it is understood that the present invention also functions in a five-dimensional torus, such as implemented in the BLUEGENE™/Q massively parallel computing system comprising compute node ASICs (BQC), each compute node including multiple processor cores.

The compute node 700 is a single chip ('nodechip') based on low power A2 PowerPC cores, though the architecture can use any low power cores, and may comprise one or more semiconductor chips. In the embodiment depicted, the node includes 16 PowerPC A2 cores running at 1600 MHz.

More particularly, the basic compute node 700 of the massively parallel supercomputer architecture illustrated in FIG. 2 includes in one embodiment seventeen (16+1) symmetric multiprocessing (PPC) cores 752, each core being 4-way hardware threaded and supporting transactional memory and thread level speculation, including a memory management unit (MMU) 100 and Quad Floating Point Unit (FPU) 753 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having an associated 2 MB of L2 cache 72. There is further provided external DDR SDRAM (i.e., Double Data Rate synchronous dynamic random access) memory 780, as a lower level in the memory hierarchy in communication with the L2. In one embodiment, the node includes 42.6 GB/s DDR3 bandwidth (1.333 GHz DDR3) (2 channels each with chip kill protection).

Each MMU 100 receives data accesses and instruction accesses from their associated processor cores 752 and retrieves information requested by the core 752 from memory such as the L1 cache 755, L2 cache 770, external DDR3 780, etc.

Each FPU 753 associated with a core 752 has a 32 B wide data path to the L1-cache 755, allowing it to load or store 32B per cycle from or into the L1-cache 755. Each core 752 is directly connected to a prefetch unit (level-1 prefetch, L1P) 758, which accepts, decodes and dispatches all requests sent out by the core 752. The store interface from the core 752 to the L1P 755 is 32 B wide and the load interface is 16 B wide, both operating at the processor frequency. The L1P 755 implements a fully associative, 32 entry prefetch buffer. Each entry can hold an L2 line of 328 B size. The LIP provides two prefetching schemes for the prefetch unit 758: a sequential prefetcher as used in previous BLUEGENE™ architecture generations, as well as a list prefetcher. The prefetch unit is further disclosed in U.S. patent application Ser. No. 11/767, 717, which is incorporated by reference in its entirety.

As shown in FIG. 7, the 32 MB shared L2 is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 778.

By implementing a direct memory access engine referred to herein as a Messaging Unit, 'MU' such as MU 750, with each MU including a DMA engine and a Network Device 750 in communication with the crossbar switch 760, chip I/O functionality is provided. In one embodiment, the compute node further includes, in a non-limiting example: 10 intra-rack interprocessor links 790, each operating at 2.0 GB/s, i.e., 10*2 GB/s intra-rack & inter-rack (e.g., configurable as a 5-D torus in one embodiment); and, one I/O link 792 interfaced with the MU 750 at 2.0 GB/s (2 GB/s I/O link (to I/O subsystem)) is additionally provided. The system node 750 employs or is associated and interfaced with an 8-16 GB memory/node (not shown).

Although not shown, each A2 processor core 752 has associated a quad-wide fused multiply-add SIMD floating point unit, producing 8 double precision operations per cycle, for a total of 328 floating point operations per cycle per compute node. A2 is a 4-way multi-threaded 64b PowerPC implementation. Each A2 processor core 752 has its own execution unit (XU), instruction unit (IU), and quad floating point unit (QPU) connected via the AXU (Auxiliary eXecution Unit). The QPU (Reference 3) is an implementation of the 4-way SIMD QPX floating point instruction set architecture. QPX is an extension of the scalar PowerPC floating point architecture. It defines 32 32 B-wide floating point registers per thread instead of the traditional 32 scalar 8 B-wide floating point registers.

Figure 8:
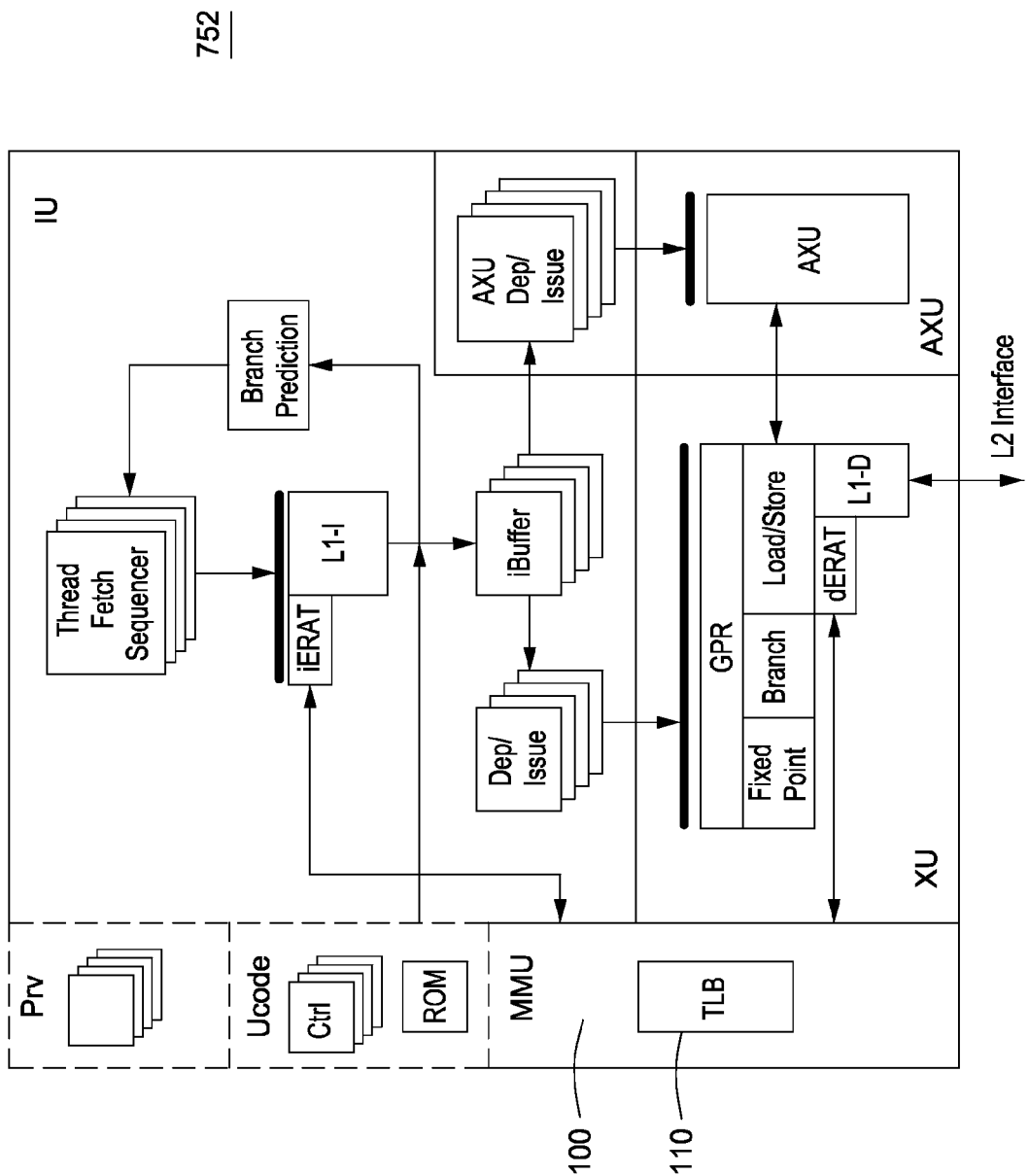
FIG. 8 is an overview of the A2 processor core organization.

FIG. 8 is an overview of the A2 processor core organization. The A2 core includes a concurrent-issue instruction fetch and decode unit with attached branch unit, together with a pipeline for complex integer, simple integer, and load/store operations. The A2 core also includes a memory management unit (MMU); separate instruction and data cache units; Pervasive and debug logic; and timer facilities.

The instruction unit of the A2 core fetches, decodes, and issues two instructions from different threads per cycle to any combination of the one execution pipeline and the AXU interface (see "Execution Unit" below, and Auxiliary Processor Unit (AXU) Port on page 49). The instruction unit includes a branch unit which provides dynamic branch prediction using a branch history table (BHT). This mechanism greatly improves the branch prediction accuracy and reduces the latency of taken branches, such that the target of a branch can usually be run immediately after the branch itself, with no penalty.

The A2 core contains a single execution pipeline. The pipeline consists of seven stages and can access the five-ported (three read, two write) GPR file. The pipeline handles all arithmetic, logical, branch, and system management instructions (such as interrupt and TLB management, move to/from system registers, and so on) as well as arithmetic, logical operations and all loads, stores and cache management operations. The pipelined multiply unit can perform 32-bit×32-bit multiply operations with single-cycle throughput and single-cycle latency. The width of the divider is 64 bits. Divide instructions dealing with 64 bit operands recirculate for 65 cycles, and operations with 32 bit operands recirculate for 32 cycles. No divide instructions are pipelined, they all require some recirculation. All misaligned operations are handled in hardware, with no penalty on any operation which is contained within an aligned 32-byte region. The load/store pipeline supports all operations to both big endian and little endian data regions.

The A2 core provides separate instruction and data cache controllers and arrays, which allow concurrent access and minimize pipeline stalls. The storage capacity of the cache arrays 16 KB each. Both cache controllers have 64-byte lines, with 4-way set-associativity I-cache and 8-way set-associativity D-cache. Both caches support parity checking on the tags and data in the memory arrays, to protect against soft errors. If a parity error is detected, the CPU will force a L1 miss and reload from the system bus. The A2 core can be configured to cause a machine check exception on a D-cache parity error. The PowerISA instruction set provides a rich set of cache management instructions for software-enforced coherency.

The ICC delivers up to four instructions per cycle to the instruction unit of the A2 core. The ICC also handles the execution of the PowerISA instruction cache management instructions for coherency.

The DCC handles all load and store data accesses, as well as the PowerISA data cache management instructions. All misaligned accesses are handled in hardware, with cacheable load accesses that are contained within a double quadword (32 bytes) being handled as a single request and with cacheable store or caching inhibited loads or store accesses that are contained within a quadword (16 bytes) being handled as a single request. Load and store accesses which cross these boundaries are broken into separate byte accesses by the hardware by the micro-code engine. When in 32 Byte store mode, all misaligned store or load accesses contained within a double quadword (32 bytes) are handled as a single request. This includes cacheable and caching inhibited stores and loads. The DCC interfaces to the AXU port to provide direct load/store access to the data cache for AXU load and store operations, Such AXU load and store instructions can access up to 32 bytes (a double quadword) in a single cycle for cacheable accesses and can access up to 16 bytes (a quadword) in a single cycle for caching inhibited accesses. The data cache always operates in a write-through manner. The DCC also supports cache line locking and "transient" data via way locking. The DCC provides for up to eight outstanding load misses, and the DCC can continue servicing subsequent load and store hits in an out-of-order fashion. Store-gathering is not performed within the A2 core.

The A2 Core supports a flat, 42-bit (4 TB) real (physical) address space. This 42-bit real address is generated by the MMU, as part of the translation process from the 64-bit effective address, which is calculated by the processor core as an instruction fetch or load/store address. Note: In 32-bit mode, the A2 core forces bits 0:31 of the calculated 64-bit effective address to zeroes. Therefore, to have a translation hit in 32-bit mode, software needs to set the effective address upper bits to zero in the ERATs and TLB. The MMU provides address translation, access protection, and storage attribute control for embedded applications. The MMU supports demand paged virtual memory and other management schemes that require precise control of logical to physical address mapping and flexible memory protection. Working with appropriate system level software, the MMU provides the following functions:

Translation of the 88-bit virtual address 1-bit "guest state" (GS), 8-bit logical partition ID (LPID), 1-bit "address space" identifier (AS), 14-bit Process ID (PID), and 64-bit effective address) into the 42-bit real address (note the 1-bit "indirect entry" IND bit is not considered part of the virtual address)

Page level read, write, and execute access control

Storage attributes for cache policy, byte order (endianness), and speculative memory access Software control of page replacement strategy The translation lookaside buffer (TLB) is the primary hardware resource involved in the control of translation, protection, and storage attributes. It consists of 512 entries, each specifying the various attributes of a given page of the address space. The TLB is 4-way set associative. The TLB entries may be of type direct (IND=0), in which case the virtual address is translated immediately by a matching entry, or of type indirect (IND=1), in which case the hardware page table walker is invoked to fetch and install an entry from the hardware page table.

The TLB tag and data memory arrays are parity protected against soft errors; if a parity error is detected during an address translation, the TLB and BRAT caches treat the parity error like a miss and proceed to either reload the entry with correct parity (in the case of an ERAT miss, TLB hit) and set the parity error bit in the appropriate FIR register, or generate a TLB exception where software can take appropriate action (in the case of a TLB miss).

An operating system may choose to implement hardware page tables in memory that contain virtual to logical translation page table entries (PTEs) per Category E.PT. These PTEs are loaded into the TLB by the hardware page table walker logic after the logical address is converted to a real address via the LRAT per Category E.HV.LRAT. Software must install indirect (IND=1) type TLB entries for each page table that is to be traversed by the hardware walker. Alternately, software can manage the establishment and replacement of TLB entries by simply not using indirect entries (i.e. by using only direct IND=0 entries). This gives system software significant flexibility in implementing a custom page replacement strategy. For example, to reduce TLB thrashing or translation delays, software can reserve several TLB entries for globally accessible static mappings. The instruction set provides several instructions for managing TLB entries. These instructions are privileged and the processor must be in supervisor state in order for these instructions to be run.

The first step in the address translation process is to expand the effective address into a virtual address. This is done by taking the 64-bit effective address and prepending to it a 1-bit "guest state" (GS) identifier, an 8-bit logical partition ID (LPID), a 1-bit "address space" identifier (AS), and the 14-bit Process identifier (PID). The 1-bit "indirect entry" (IND) identifier is not considered part of the virtual address. The LPID value is provided by the LPIDR register, and the PID value is provided by the PID register (see Memory Management on page 177).

The GS and AS identifiers are provided by the Machine State Register which contains separate bits for the instruction fetch address space (MACHINE STATE REGISTER[IS]) and the data access address space (MACHINE STATE REGISTER[DS]). Together, the 64-bit effective address, and the other identifiers, form an 88-bit virtual address. This 88-bit virtual address is then translated into the 42-bit real address using the TLB.

The MMU divides the address space (whether effective, virtual, or real) into pages. Five direct (IND=0) page sizes (4 KB, 64 KB, 1 MB, 16 MB, 1 GB) are simultaneously supported, such that at any given time the TLB can contain entries for any combination of page sizes. The MMU also supports two indirect (IND=1) page sizes (1 MB and 256 MB) with associated sub-page sizes (refer to Section 6.16 Hardware Page Table Walking (Category E.PT)). In order for an address translation to occur, a valid direct entry for the page containing the virtual address must be in the TLB. An attempt to access an address for which no TLB direct exists results in a search for an indirect TLB entry to be used by the hardware page table walker. If neither a direct or indirect entry exists, an Instruction (for fetches) or Data (for load/store accesses) TLB Miss exception occurs.

To improve performance, both the instruction cache and the data cache maintain separate "shadow" TLBs called ERATs. The ERATs contain only direct (IND=0) type entries. The instruction I-ERAT contains 16 entries, while the data D-ERAT contains 32 entries. These ERAT arrays minimize TLB contention between instruction fetch and data load/store operations. The instruction fetch and data access mechanisms only access the main unified TLB when a miss occurs in the respective ERAT. Hardware manages the replacement and invalidation of both the I-ERAT and D-ERAT; no system software action is required in MMU mode. In ERAT-only mode, an attempt to access an address for which no ERAT entry exists causes an Instruction (for fetches) or Data (for load/store accesses) TLB Miss exception.

Each TLB entry provides separate user state and supervisor state read, write, and execute permission controls for the memory page associated with the entry. If software attempts to access a page for which it does not have the necessary permission, an Instruction (for fetches) or Data (for load/store accesses) Storage exception will occur.

Each TLB entry also provides a collection of storage attributes for the associated page. These attributes control cache policy (such as cachability and write-through as opposed to copy-back behavior), byte order (big endian as opposed to little endian), and enabling of speculative access for the page. In addition, a set of four, user-definable storage attributes are provided. These attributes can be used to control various systemlevel behaviors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 8. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A system for accessing memory comprising:
a processor device issuing a request for a memory page at a virtual address;
a translation look-aside buffer (TLB) for storing one or more page table entries, wherein each of the one or more page table entries maps said virtual address to a physical address, and a table entry providing an exclusion bit indicating a memory sub-region to be excluded from within said requested memory page;
a logic circuit for receiving a virtual address from said processor device, said logic circuit for matching the virtual address to a virtual page number in one of the page table entries to select the physical page number in the same page table entry,
wherein said memory sub-region of the requested memory page is available for subsequent filling with one or more smaller fixed-size memory pages.

2. The system of claim 1, wherein said exclusion bit is set to a logic 1 to allow the predetermined memory range to be excluded from the page.

3. The system of claim 2, wherein the virtual page number comprises one or more least significant bits, said least significant bits used to exclude the virtual address from matching the virtual page number, therefore excluding the memory range from the page.

4. The system of claim 3, wherein said logic circuit comprises a comparator and the logic circuit uses said comparator to compare one or more bits in the virtual address at the same bit positions to said one or more least significant bits in the virtual page number in each of the one or more page table entries.

5. The system of claim 2, wherein said logic circuit comprises a comparator and the logic circuit uses said comparator to evaluate the value of the exclusion bit.

6. The system of claim 1, wherein said logic circuit comprises a first comparator for matching one or more most significant bits within the virtual address to bits within the virtual page number in one page table entries to select the physical page number and a second comparator for matching one or more least significant bits with the virtual address to bits within the page number to exclude said memory range from the page.

7. The system of claim 6, wherein said logic circuit further comprises: a third comparator for evaluating the exclusion bit and when the exclusion bit is set to 1 causing the memory range to be excluded from the page.

8. The system of claim 2, wherein other page table entries comprise bits for accessing the memory range excluded from the page.

9. The system of claim 2, wherein said exclusion bit is set to logic 0 to allow access to the entire page.

10. The system of claim 1, wherein said fixed-size page sizes filled in the sub-region are page size aligned.

11. The system of claim 1, wherein said fixed-size page sizes filled in the sub-region do not overlap.

12. The system of claim 1, wherein said memory sub-region to be excluded is smaller than a page size of the table entry, said memory sub-region being configurable to M×4 KB, where M=1 to (TLB table entry page size in bytes/$2^{12}$)−1.

13. The system of claim 1, wherein said fixed-size page sizes filled in the sub-region are page size aligned.

14. A method for accessing memory comprising:
receiving at a logic device a virtual address; and
matching the virtual address to a virtual page number in one of one or more page table entries stored in a translation look-aside buffer (TLB) table to select a physical page and translate the virtual address to a physical address, a TLB entry providing an exclusion bit indicating a memory sub-region to be excluded from within said physical page;
wherein said memory sub-region of said physical page is available for subsequent filling with one or more smaller fixed-size memory pages.

15. The method of claim 14, wherein the virtual address comprises one or more most significant bits and one or more least significant bits, and each of the one or more page table entries comprises a virtual page number and a physical page number, the method further comprising:
matching bitwise the one or more most significant bits to the virtual page number to select the physical page number; and
matching bitwise the one or more least significant bits to the virtual page number to exclude the memory range in the page.

16. The method of claim 15, wherein the exclusion bit, is set to logic 1the method further comprises:
comparing one or more least significant bits within said virtual address to the virtual page number to exclude the predetermined memory range in the page.

17. The method of claim 16, wherein other page table entries comprise bits for accessing the memory range excluded from the page.

18. The method of claim 15, wherein said exclusion bit is set to logic 0to allow accessing the entire page.

19. The method of claim 14, wherein said fixed-size page sizes filled in the sub-region do not overlap.

20. The method of claim 14, wherein said memory sub-region to be excluded is smaller than a page size of the table entry, said memory sub-region being configurable to M×4 KB, where M=1 to (TLB table entry page size in bytes/$2^{12}$)−1.

* * * * *